Feb. 14, 1928.

H. E. SLADE

ELECTRICAL OUTLET DEVICE

Filed Dec. 11, 1926

INVENTOR:
HAROLD E. SLADE,
BY
ATTORNEYS.

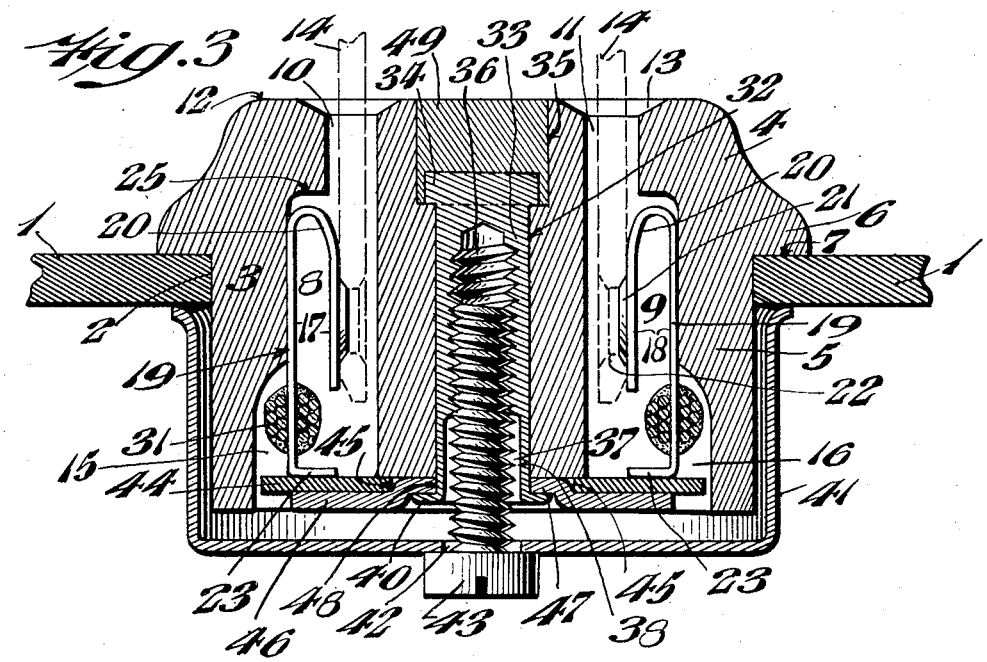
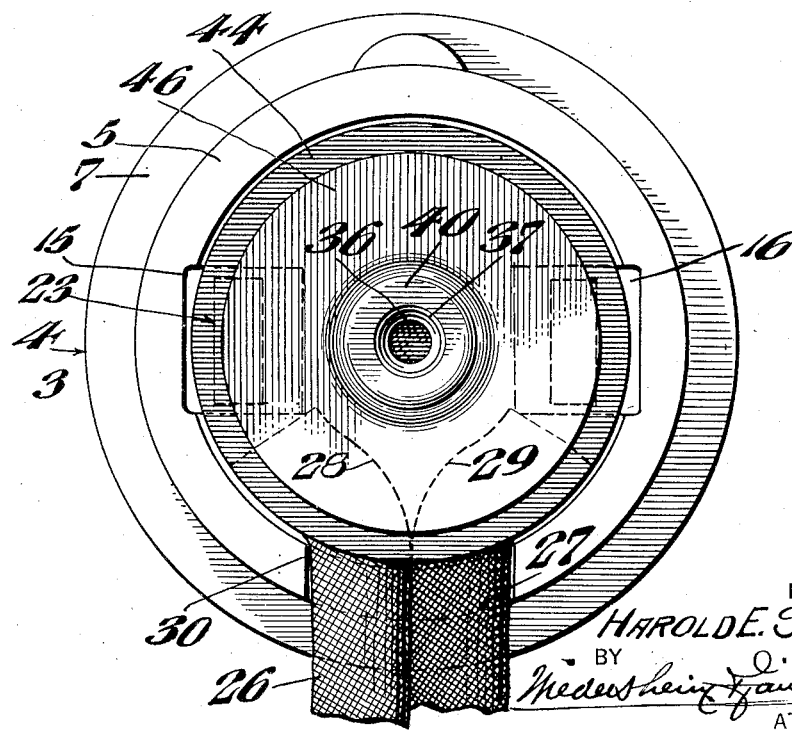

Patented Feb. 14, 1928.

1,658,861

UNITED STATES PATENT OFFICE.

HAROLD E. SLADE, OF GLEN RIDGE, NEW JERSEY, ASSIGNOR TO BEAVER MACHINE & TOOL CO., INC., OF NEWARK, NEW JERSEY, A CORPORATION OF NEW JERSEY.

ELECTRICAL OUTLET DEVICE.

Application filed December 11, 1926. Serial No. 154,164.

My invention relates to a new and useful improvement in electrical outlet devices, of the type adapted to receive and to coact with the conventional blade or plug type of electrical connectors, and it relates more particularly to an electrical outlet device adapted to be mounted or installed upon electrical fixtures, such as wall lighting brackets and the like or to be mounted upon a supporting wall or panel, such as the wall plate of a standard iron outlet box.

The electrical outlet device, of my present invention is adapted to be mounted in a suitable opening, in any thin panel or wall, such as the metallic wall of an electrical fixture, a wall lighting bracket, or the metallic wall of a wall plate of a standard electrical outlet box and to be rigidly secured thereto in an easy manner, and in a pre-assembled condition.

My invention consists more particularly in an electrical outlet device of the character stated, which may be mounted quickly and with great facility, upon any electrical fixture or wall plate or the like having a suitable opening to receive the electrical outlet, and one which will be of a minimum size, and which will be durable and inexpensive, and one which at the same time will minimize the fire hazard. My invention consists more particularly of an electrical outlet of the character stated, which, after being completed, wired and assembled, may be applied to, or mounted in any electrical fixture or the like, as a unitary structure, that is, one in which all the component parts of the outlet are held together firmly, while the same is being mounted upon or applied to an electrical fixture or wall plate or the like.

The novel features of construction of my present electrical outlet device are described more in detail hereinbelow and shown more particularly in the accompanying drawings.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 3, represents a section on line 3—3 of Figure 4, illustrating a modified form of construction embodying my present invention, similar to that shown in Figure 1.

Figure 4, represents a bottom plan view of the construction shown in Figure 3, with the inner metallic securing or clamping shell removed therefrom.

Figure 1:
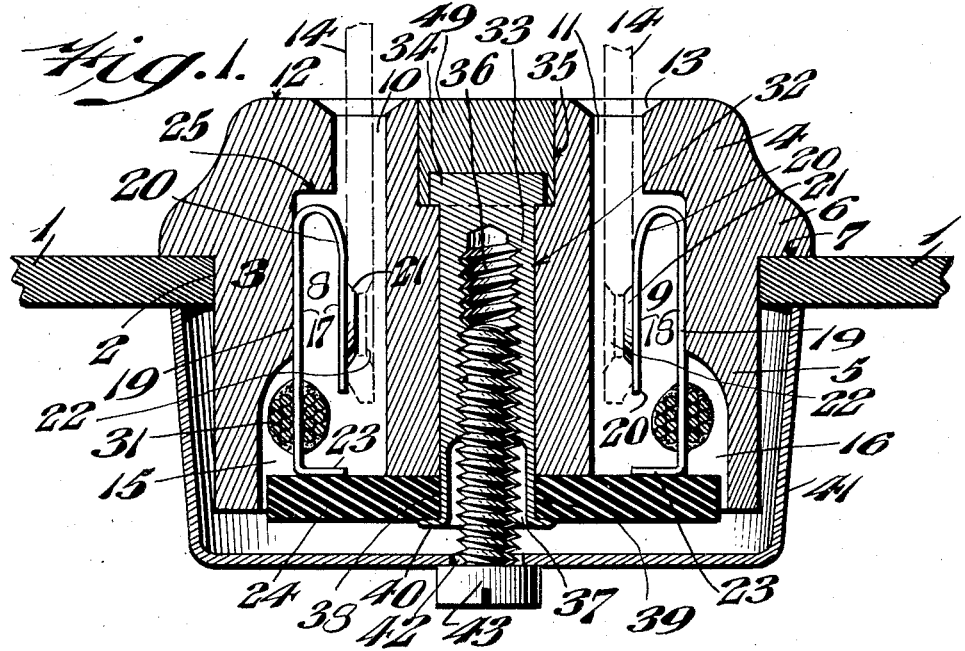
Figure 1, represents a vertical and axial cross section of the novel electrical outlet device embodying my invention, taken generally on line 1—1 of Fig. 2.
Figure 2:
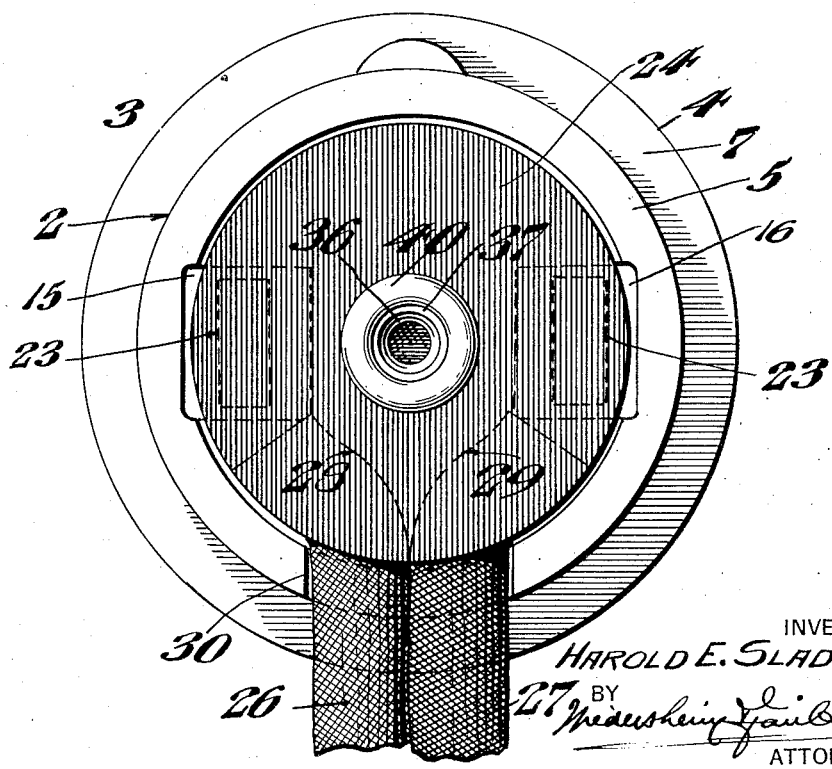
Figure 2, represents a bottom plan view of the same with the inner metallic securing or clamping shell removed therefrom.

Referring first to Figures 1 and 2 of the accompanying drawings, 1 designates a supporting wall or panel having a suitable aperture or opening 2 therein, in which an electrical outlet is to be mounted. The wall 1 may be the metallic wall of any electrical fixture as for instance a wall lighting bracket, or other lighting fixture or the like, or it may be a wall plate of a standard electrical outlet box, or the like.

My novel outlet device comprises the housing or body 3, of any suitable insulating material, such as composition, hard rubber, bakelite, porcelain or the like, and comprises an outer portion 4, which is adapted to be positioned exteriorly of the supporting wall 1, and the inner portion 5 of reduced diameter, which is adapted to be inserted into the supporting wall 1, and to be concealed thereby. The outer portion 4, is provided with an enlarged flange portion 6, having a transverse annular shoulder 7, substantially at a right angle to the longitudinal axis of the device, and adapted to abut against the outer surface of the supporting wall or panel 1, around the periphery of the opening 2, as shown particularly in Fig. 1. The inner portion 5 of the housing is of generally cylindrical shape and is reduced in diameter to fit within the opening 2.

A pair of symmetrical contact chambers 8 and 9 are provided in the housing 4, extending generally parallel to the longitudinal axis of the housing and spaced equi-distantly therefrom, communicating with and terminating in, the corresponding blade receiving apertures 10 and 11, which terminate in the outer face 12 of the housing 1. The outer end of the blade receiving openings 10 and 11 are beveled or flared outwardly, as indicated at 13, in order to facilitate the insertion of the contact blades 14, of the conventional blade type of electrical connector plugs, indicated in dotted lines in Fig. 1. The inner ends of the contact chambers 8 and 9 terminate in the enlarged wire, or connector spaces 15 and 16 respectively, in which the lead wires or the ends of the same, are affixed to the contact members 17 and 18 respectively, which are disposed within the corresponding spring contact chambers 8 and 9.

Each of the contact members 17 and 18 comprises the upright or vertical body portion 19, and the resilient blade engaging member 20, bent back upon the body portion 19, so as to form a generally U-shaped construction therewith, and disposed in operative alignment with the blade receiving openings 10 and 11, so as frictionally to engage the blades 14 when inserted into the recesses 10 and 11. Each of the blade engaging members 20 is also provided with a slight projection or boss 21, which is adapted to seat within the corresponding depressions or apertures 22, usually provided in the blades 14 of the blade type of electrical plug connectors. By this means a firmer interengagement is secured between the blade engaging members 20 and the blades 14, thereby preventing any accidental withdrawal of the blades from the outlet. Each of the contact members 17 and 18 is also provided with a transverse foot 23, extending at substantially a right angle to the body portion 19 thereof, which is adapted to abut a rear insulating closure disc or member 24, superimposed upon the rear end of the housing 3, so as to confine the contact members 17 and 18 between said closure member 24 and the transverse shoulder 25, formed between the contact chambers 8 and 9 and the corresponding and narrower blade receiving openings 10 and 11.

The lead wires 26 and 27 are seated within transverse wire channels 28 and 29 respectively, formed in the inner end of the housing 3, communicating at their inner ends with the corresponding connection chambers 15 and 16 respectively, as shown in Fig. 2 and merging in a common wire receiving channel 30, at their outer ends, through which the lead wires 26 and 27 enter the housing 1. Connection may be established between the metallic wires within the leads 26 and 27, and the corresponding contact members 17 and 18, by any suitable means, as for instance by removing the terminal portion of the insulating covering of the conductors 26 and 27 and soldering the wires to the vertical body portions 19 of the contact members. In the illustration shown in the Figures 1 and 3, the inner metallic wires 31, are of the multi-strand type, in which case the wire may be divided or bent around the body 19, of the contact members 17 and 18, and then soldered or otherwise secured thereto.

The insulating housing member 3 is also provided with a longitudinal and axial opening 32, in which an internally threaded metallic bushing 33 is disposed having an inner enlarged portion, head, or anchorage 34 seated within a correspondingly enlarged portion 35 of the opening 32, whereby the metallic bushing is firmly secured and anchored within the housing. The metallic bushing 33 is provided with a longitudinal and axial hole 36, internally threaded, and having the bore of the outer terminal 37 thereof enlarged as at 37, so as to form a relatively thin walled terminal tubular member 38 projecting beyond and disposed exteriorly of the housing 3. The thin walled terminal tubular member 38, as will be described hereinafter, is adapted to act as a permanent fastening means, to secure the closure member 24 to the housing 3, and to retain the same, as well as the contact members 17 and 18 and the wires 26 and 27, firmly in assembled relation to each other.

Thus, after the contact members 17 and 18 have been carefully positioned within the corresponding contact chambers 8 and 9, and after the two leads 26 and 27 have been carefully positioned within the corresponding channels, and the wires 31 secured in electrical engagement with the contact members 17 and 18, as shown in Figs. 1 and 3, the insulating closure disc 24, having a central aperture or opening 39 therein, is superimposed upon the rear end of the housing 3 with the opening 39 fitting over the thin walled terminal tubular portion 38 of the inner metallic bushing 33. It should be understood here, that prior to the assembling of the outlet device, the terminal, tubular cylindrical portion 38 is straight. After the proper positioning of the closure disc 24, the outermost end of the tubular member 38 is turned or rolled outwardly, so as to form a laterally extending locking flange or bead 40, overhanging and firmly engaging the closure disc 24, immediately around the periphery of the opening 39 therein, so as firmly to secure the closure 24 to the body of the housing 3 and thereby to maintain the electrical outlet in an assembled condition, with the contact members 17 and 18 as well as the wires securely encased therein.

The outlet assembly, comprising the housing 3, having the contacts 17 and 18 as well as the lead wires 26 and 27 firmly positioned therein and the closure 24 secured thereto, is then ready, as a unit, to be installed or mounted upon any desired electrical fixture or wall plate or the like. The assembly thus produced is merely inserted into a suitable opening 2 in any metallic or other wall portion of the electrical fixture or in any other suitable panel or wall plate 1, with the outer receiving end or portion 4 thereof positioned exteriorly of said wall and with the inner reduced diameter portion 5 thereof projecting thereinto. A cup shaped metallic securing shell 41, is then placed over the inner portion 5 of the housing 3, said securing shell 41 having a central opening 42 therein, through which a screw 43 is extended, which is then threaded into the internally threaded bushing 33, within the housing 3, of the outlet device. The diameter of the securing shell 41 is such as to encase within it the entire outlet device, and the wall of said shell is provided with a suitable recess corresponding to the wire passageway 30 in the housing, through which the electrical leads or conductors 26 and 27 are adapted to pass. The securing shell 41 is brought into abutting relation with the inner surface of the supporting wall or panel 1 and the housing is thereby drawn into said shell 41, and maintained firmly in position with the peripheral edge of the aperture 2 in the supporting wall 1, clamped firmly between the shoulder 7 of the housing 3, and the free peripheral edge of the securing shell 41.

In Figs. 3 and 4 I have illustrated a slightly modified embodiment of my invention, this modification being applicable chiefly where it is desired to reduce the depth of the outlet device to a minimum. Thus in this embodiment of my invention instead of applying a relatively thick insulating closure member 24, secured in position by the rolled over peripheral edge or flange 40, of the terminal tubular member 38, a relatively thin insulating closure member 44 may be provided instead, having a relatively large central opening 45 therein, extending over the inner end of said insulating housing 3, and a metallic securing disc or washer 46 is provided, having a central depressed or offset portion 47, which is adapted to seat within the opening 45 of the insulating closure 44, and having a central opening 48, which in turn is adapted to receive the tubular terminal portion 38 of the metallic bushing 33. The securing flange 40 is then turned or rolled over onto the depressed central portion 47 of the metallic securing disc 46, so as firmly to engage and secure the same; said disc in turn securing the relatively thin insulating closure member 44. By this means, the effective thickness of the closure member may be reduced to a minimum. Moreover by the engagement of the metallic disc 46 by the rolled flange 40, a more secure fastening means is provided, which is not likely to work loose by any slight wear of the relatively soft insulating composition of which the closure member must be formed, since the insulating closure member 44 is in turn engaged by the metallic disc 46 over a relatively large area, as will readily be seen from Figs. 3 and 4.

The internally threaded metallic bushing 33, having the relatively thin walled outer tubular securing portion 38, may either be molded into the body or housing member 3, or it may be inserted subsequent to the molding of the body 3, as indicated in Figs. 1 and 3. These two methods are alternative. If the bushing 33 is to be inserted into a pre-moulded housing 3, the opening 32 in the housing must extend completely through the same, and the bushing is inserted from the outer end, and the outer end is then subsequently filled with any suitable cement or composition 49, thereby permanently to embed the bushing 33 and to conceal the same from view, from without.

It will be seen from the foregoing that by my novel construction I have devised an electrical outlet device, adapted to be used in conjunction with the conventional blade type of electrical connectors, and one which may be wired completely and assembled as a unit, and which may then be installed or mounted in any suitable fixture, panel wall plate or the like, with great ease and facility, since all the component parts thereof are held together firmly as a single assembled unit. Thus after the assembled unit has been wired, as described hereinbefore, and the closure member has been applied, and secured thereto, by rolling or turning over the lateral flange 40, the only separable parts of the outlet, are the assembly unit, the cup-shaped securing shell 41, and the single securing screw 43.

It will now be apparent that I have devised a novel and useful construction of electrical outlet device, which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:—

1. In a device of the character stated, an insulating housing, contact chambers within said housing, contact members seated in said chambers, an insulating closure member on said housing having an opening therethrough, a metallic bushing in said housing and anchored therein having a relatively thin tubular terminal portion exteriorly of said housing extending through the opening in said closure member and having a laterally extending terminal flange portion to lock and secure said closure member to said housing, a clamping member extending across the rear portion of said housing and a screw passing through said member and threadedly anchored in said bushing.

2. An electrical wiring device comprising an insulating housing, contact chambers within said housing, contact members positioned in said chambers, an insulating closure member on the end of said housing to enclose said contact members therein, a metallic plate on said insulating closure having an opening therethrough, a metallic bushing anchored within said housing and having a relatively thin tubular terminal portion projecting exteriorly of said housing and extending through said insulating closure and through the opening of said metallic plate, and an outwardly extending lateral flange at the outer end of said tubular terminal portion, overhanging said metallic plate and engaging the same firmly to clamp said metallic plate onto said insulating closure thereby firmly to secure said insulating closure to said housing member, a clamping member extending across the rear portion of said housing and a screw passing through said member and threadedly anchored in said bushing.

3. An electrical wiring device comprising an insulating housing, contact chambers within said housing, contact members positioned in said chambers, an insulating closure on the end of said housing to inclose the contact members therein having a relatively large central opening therein, a metallic plate on said insulating closure having a central offset or depressed portion seated within the central opening in said insulating closure and having a central opening extending therethrough, a metallic bushing anchored within said housing and having a relatively thin terminal tubular portion projecting exteriorly of said housing and extending through said metallic plate and having an outwardly extending lateral flange on the end thereof overhanging and engaging said metallic plate firmly to clamp said plate against said insulating closure, thereby to clamp said insulating closure tightly against said housing.

4. The combination with an apertured wall, of an electrical outlet device adapted to be mounted upon said wall and to be carried thereby, and to have a portion thereof extending through said aperture, said electrical outlet device comprising an insulating housing having a reduced diameter inner portion and an enlarged diameter outer portion exteriorly of said wall and having a transverse annular shoulder intermediate said portions of different diameters, a pair of oppositely disposed contact chambers within said housing, the latter having blade receiving apertures extending from the outer end of said housing into said contact chambers, a spring contact member within each of said chambers having resilient blade engaging contact members in operative alignment with said blade receiving apertures, an insulating closure member on the end of said housing to inclose said contact members therein, a metallic bushing anchored within said housing and having a relatively thin tubular terminal portion projecting exteriorly of said housing and extending through said insulating closure member and having an outwardly extending lateral terminal flange in locking relation with said closure member firmly to secure the latter to said housing, a cup shaped metallic securing shell encasing the inner portion of said insulating housing, of a depth slightly greater than the depth of said housing, and means in threaded engagement with said anchored bushing for drawing said housing shell together and thereby firmly to clamp said supporting wall between said housing, shoulder and the free peripheral edge of said securing shell.

5. The combination with an apertured wall, of an electrical outlet device adapted to be mounted upon said wall and to be carried thereby, and to have a portion thereof extending through said aperture, said electrical outlet device comprising an insulating housing having a reduced diameter inner portion and an enlarged diameter outer portion exteriorly of said wall and having a transverse annular shoulder intermediate said portions of different diameters, a pair of oppositely disposed contact chambers within said housing, the latter having blade receiving apertures extending from the outer end of said housing into said contact chambers, a spring contact member within each of said chambers having resilient blade engaging contact members in operative alignment with said blade receiving apertures, an insulating closure member on the end of said housing, to inclose said contact members therein, an internally threaded metallic bushing anchored within said housing and having a relatively thin tubular terminal portion projecting exteriorly of said housing and extending through said insulating closure member and having an outwardly extending lateral terminal flange in locking relation with said closure member firmly to secure the latter to said housing, a cup shaped metallic securing shell enclosing the inner portion of said insulating housing, of a depth slightly greater than the depth of said housing, and a screw extending through said securing shell and threaded into said internally threaded metallic bushing for drawing said housing and shell together and thereby firmly to clamp said supporting wall between said housing shoulder and the free peripheral edge of said securing shell.

6. An electrical outlet device, adapted to be mounted upon a wall and to have a portion thereof extend therethrough and comprising an insulating housing having a reduced diameter inner portion and an enlarged diameter outer portion with a transverse annular shoulder intermediate said portions of different diameters, a pair of oppositely disposed contact chambers within said housing, the latter having blade receiving apertures extending thereinto, a contact member within each of said chambers, an insulating closure member on the inner end of said housing to enclose said contact members therein, a metallic bushing anchored within said housing and having an annular terminal portion projecting exteriorly of said housing and extending through said insulating closure member, and having an outwardly extending lateral terminal flange in locking relation with said closure member, a cup shaped, metallic shell encasing the inner portion of said housing and means in threaded engagement with said bushing for drawing said housing and shell together.

7. An electrical outlet device adapted to be mounted upon a wall and to have a portion thereof extend therethrough and comprising an insulating housing having inner and outer portions, of different diameters, a transverse shoulder intermediate said portions oppositely disposed contact chambers within said housing, said chambers having blade receiving apertures extending thereinto, a contact member within each of said chambers, an insulating closure member on the inner end of said housing, an internally threaded metallic bushing anchored within said housing and having an outwardly extending terminal flange in locking relation with said closure member firmly to secure the latter to said housing, a cup shaped metallic shell enclosing the inner portion of said housing and an axial screw extending through said securing shell and threaded into said bushing for drawing said housing and shell together firmly to clamp said shell against said housing shoulder.

8. A device of the character stated, adapted to be mounted in an apertured supporting wall, said device comprising an insulating housing having a rearward shoulder adapted to engage the front of the supporting wall adjacent said aperture and having a pair of spaced contact chambers extending therethrough and retaining shoulders in said chambers, a prong-engaging contact member disposed within each of said chambers adapted to receive electrical connection prongs through the outer ends of said chambers, an insulating closure confining the contact members within said contact chambers and a detachable clamping member spaced entirely from said insulating closure and secured in such spaced relation, in juxtaposition to the rearward shoulder of said housing, adapted to engage the rear surface of said supporting wall adjacent the aperture thereof.

9. A device of the character stated, adapted to be mounted in an apertured supporting wall, said device comprising an insulating housing having a rearward shoulder adapted to engage the front of the supporting wall adjacent said aperture and having a pair of spaced contact chambers extending therethrough, a prong-engaging contact member disposed within each of said chambers adapted to receive electrical connection prongs through the outer ends of said chambers; said contact members having means at their inner ends for the attachment of electrical conductor wires thereto, an insulating closure confining the contact members and said wire attaching means within said contact chambers, and a detachable clamping member spaced entirely from said insulating closure and secured in such spaced relation, in juxtaposition to the rearward shoulder of said housing, adapted to engage the rear surface of said supporting wall adjacent the aperture thereof.

10. A device of the character stated, adapted to be mounted in an apertured supporting wall, said device comprising an insulating housing having a rearward shoulder adapted to engage the front of the supporting wall adjacent said aperture and having a pair of spaced contact chambers extending therethrough, a prong-engaging contact member disposed within each of said chambers adapted to receive electrical connection prongs through the outer ends of said chambers, an insulating closure permanently secured to said housing, for confining the contact members within said contact chambers, and a detachable clamping member secured in spaced relation to the rear portion of said insulating housing, in juxtaposition to the rearward shoulder of said housing, adapted to engage the rear surface of said supporting wall adjacent the aperture thereof.

11. A device of the character stated, adapted to be mounted in an apertured supporting wall, said device comprising an insulating housing having a rearward shoulder adapted to engage the front of the supporting wall adjacent said aperture and having a pair of spaced contact chambers extending therethrough, a prong-engaging contact member disposed within each of said chambers adapted to receive electrical connection prongs through the outer ends of said chambers; an insulating closure permanently secured to said housing, for confining the contact members within said contact chambers, and a detachable clamping member secured in spaced relation to the rear portion of said insulating housing, in juxtaposition to the rearward shoulder of said housing, adapted to engage the rear surface of said supporting wall adjacent the aperture thereof.

HAROLD E. SLADE.